Dec. 20, 1932.  E. DANNER  1,891,373
GLASS FORMING METHOD AND APPARATUS
Filed June 11, 1931   6 Sheets-Sheet 1

Inventor
Edward Danner
By Owen & Owen
Attorneys

Inventor
Edward Danner
By Owen & Owen
Attorneys

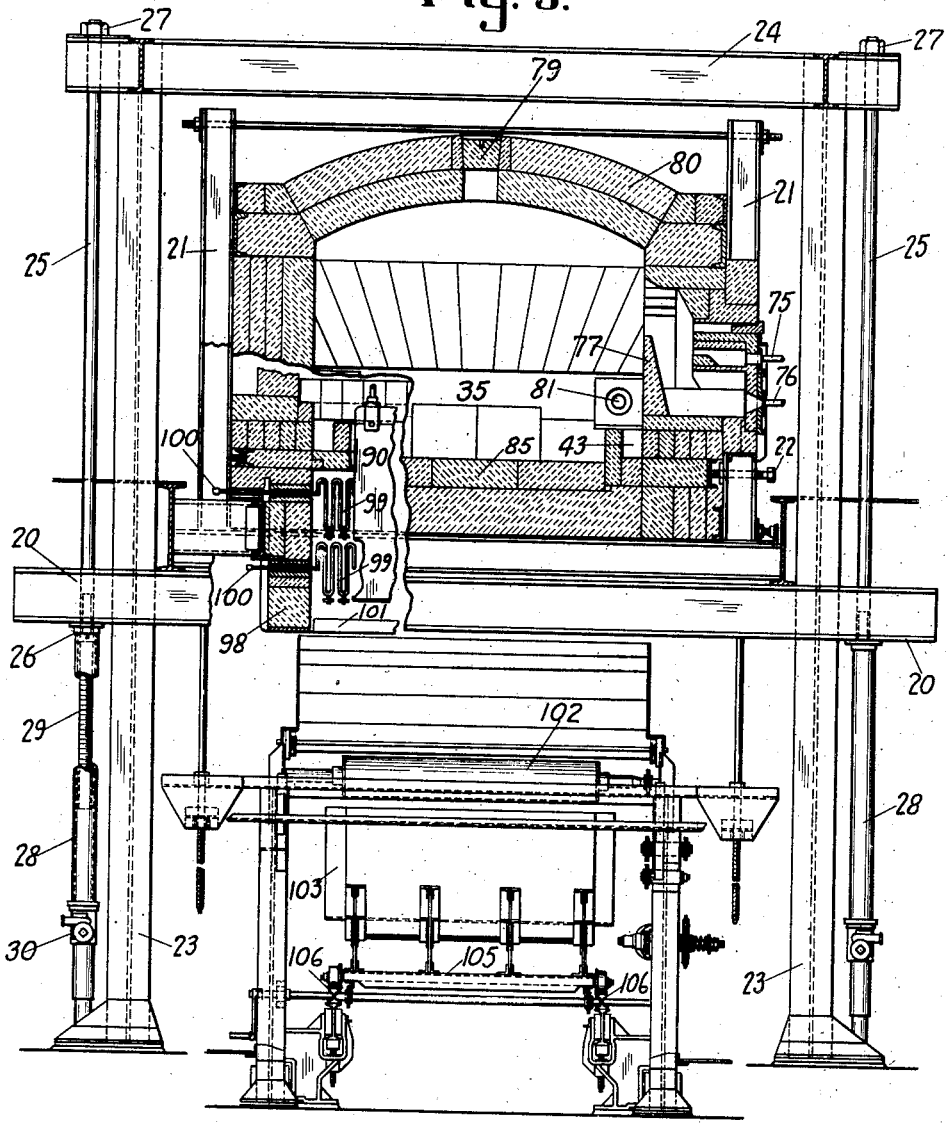

Dec. 20, 1932.       E. DANNER       1,891,373
GLASS FORMING METHOD AND APPARATUS
Filed June 11, 1931      6 Sheets-Sheet 4
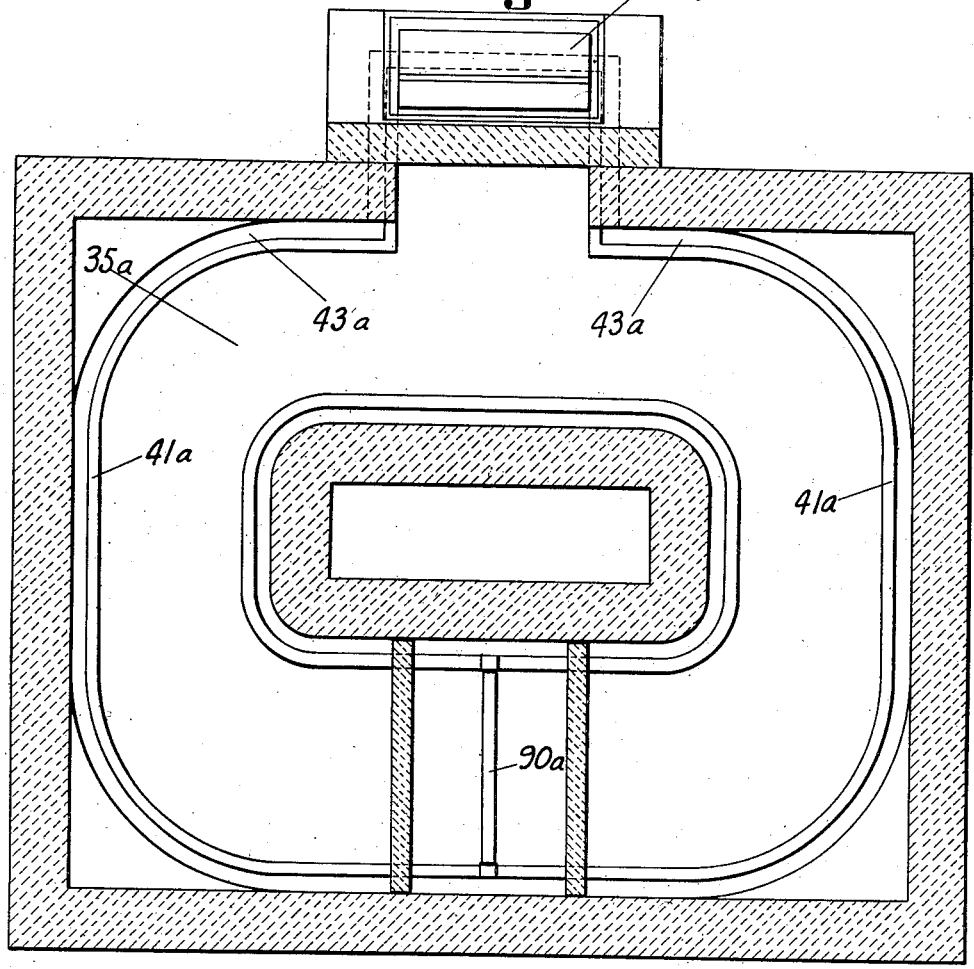
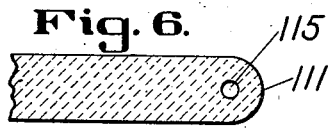
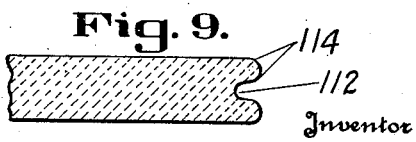
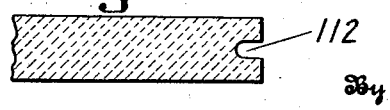
Inventor
Edward Danner
By Owen - Owen
Attorneys Dec. 20, 1932.       E. DANNER       1,891,373
GLASS FORMING METHOD AND APPARATUS
Filed June 11, 1931       6 Sheets-Sheet 5

Inventor
Edward Danner
By Owen & Owen
Attorneys

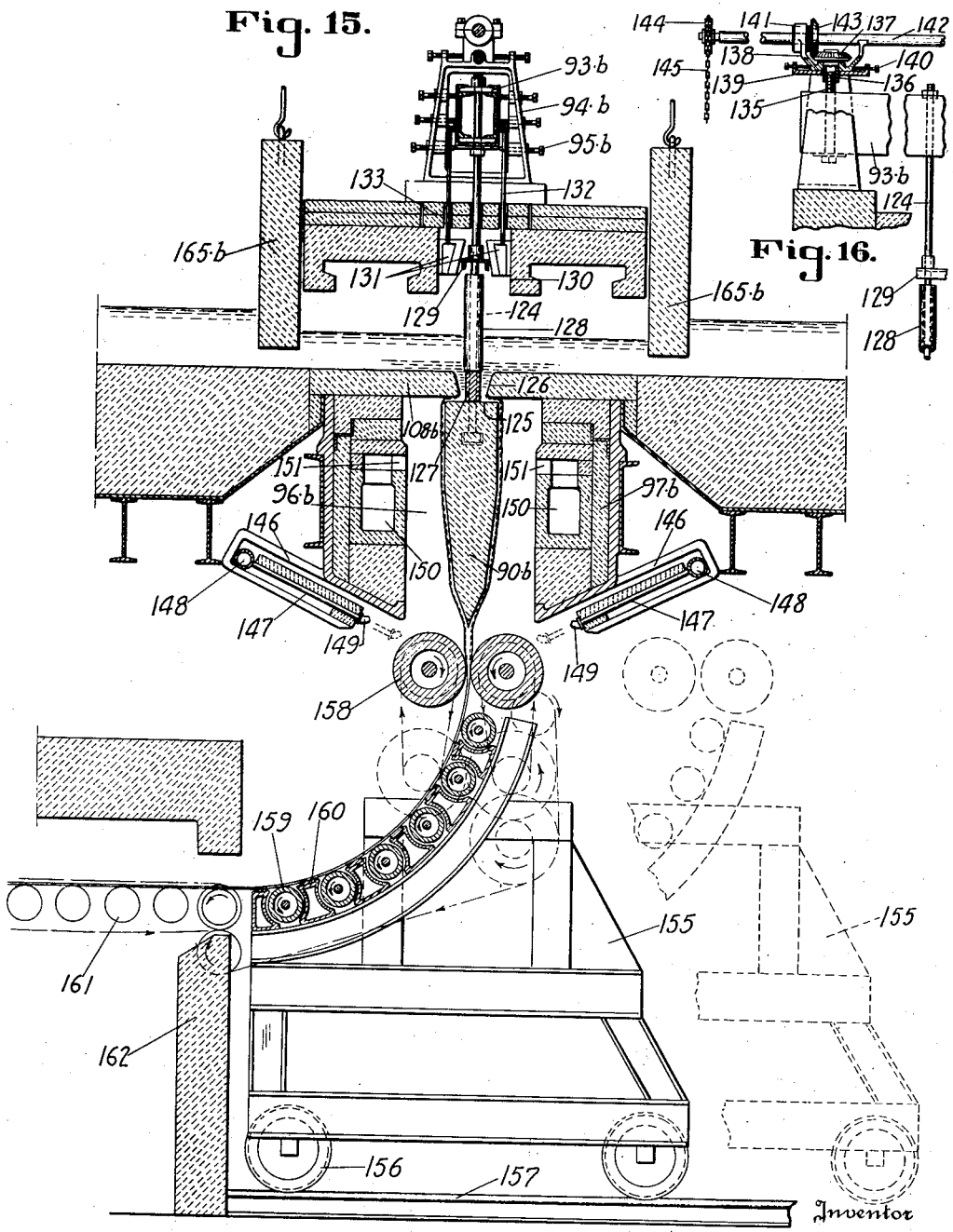

Patented Dec. 20, 1932

1,891,373

UNITED STATES PATENT OFFICE

EDWARD DANNER, OF NEWARK, OHIO

GLASS FORMING METHOD AND APPARATUS

Application filed June 11, 1931. Serial No. 543,520.

This invention relates to a method and apparatus for forming glass, and more particularly for forming glass where the molten glass is poured from pots into a chamber from which it is flowed or worked.

In producing the highest quality of glass, the melting has been done in pots instead of tanks. A pot of molten glass is then transported to a casting table or other point where it is to be shaped. In making sheet or plate glass from metal molten in pots, the process is usually intermittent. Moreover, the glass immediately adjacent the wall of the pot is usually contaminated to some extent by material of the wall being dissolved in the glass, and this impure glass results in blemishes which compel the discarding of portions of each sheet.

One object of this invention is to deliver glass from pots to a working furnace in such a way that the impure glass is segregated and deflected from the main body of pure glass, so that a supply of exceptionally pure glass may be obtained in the working furnace, and utilized for the making of high grade ware of any kind. Another object is to deflect glass chilled or otherwise injured during the feeding of the working chamber. Another object of the invention is to provide a practical method and apparatus for producing a continuous sheet from pot-melted glass.

The details and minor objects of the invention will appear as the description proceeds.

In the accompanying drawings forming a part of this specification—

Figure 3 is a vertical cross section of the apparatus shown in Fig. 1, approximately along the line 3—3 of Fig. 1, parts being broken away along the right middle portion of the section;

Figure 4 is a diagrammatic view somewhat similar to Fig. 2, but showing a modified construction;

Figures 5 to 9 are sections through the one side of the forming slab showing different possible constructions of the edge of the slab;

Figure 15 is an enlarged section through the forming portion of the apparatus and showing a modified construction of this apparatus; and Figure 16 is a detail view of one end of the supporting and adjusting means for the forming slab.

Figure 1:
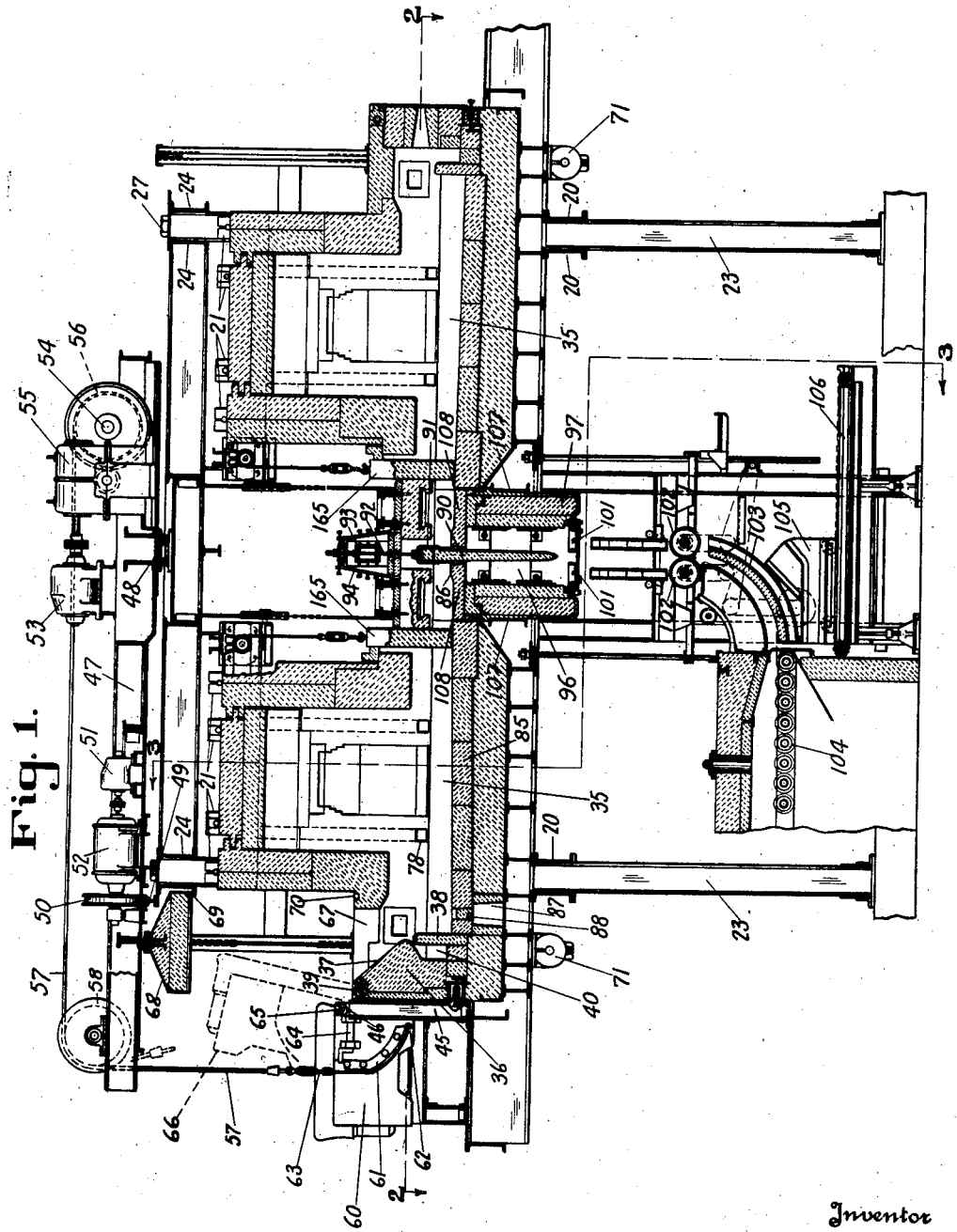
Figure 1 is a longitudinal vertical section through apparatus embodying one form of the invention.

The apparatus disclosed in the drawings is suitable for forming sheet glass. It will be understood that the broader features of the invention may be applied to apparatus for forming glass in other ways, but for convenience the description will be given first of the sheet glass forming apparatus illustrated in the drawings.

The furnace and container from which the glass is flowed to form the sheet is constructed of the usual refractory blocks, and is shown as being surrounded with insulating material so as to reduce to a minimum the waste of heat. This furnace is supported upon beams 20 and between the usual buckstaves 21, there being provided the usual screws 22 at necessary points for taking up expansion and contraction.

In the construction shown, uprights 23 support cross pieces 24 from which there depend rods 25 passing through beams 20 and having thereon nuts 26 beneath the beams. Heads 27 at the upper ends of rods 25 rest upon beams 24. Sleeves 28 surround the lower threaded ends 29 of rods 25 and rest upon jacks 30. The jacks and sleeves may remain in place permanently, or may be used only temporarily during the vertical adjustment of beams 20. When the beams 20 are to be adjusted vertically, the jacks are operated to raise the sleeves 28 against nuts 26 so as to raise the furnace to desired position, if the furnace is to be elevated, or to take the weight off of rods 25, if the furnace is to be lowered. In either case, after the weight is supported upon the jacks, rods 25 are adjusted through nuts 26 until the heads 27 are in the desired adjusted relation to nuts 26. Thereafter the jacks are operated to lower the sleeves and nuts until the weight of the furnace is suspended by rods 25.

In the construction shown the furnace comprises two duplicate ends. Since these ends are duplicates, the description of one in detail will be sufficient.

Each end of the furnace comprises a glass receiving chamber 35 which receives glass at the end of the furnace and delivers it at the middle portion of the furnace. At the receiving end of the furnace there is a flow block 36 which, in the construction shown in Fig. 1, has an inclined upper surface 37 which extends downwardly to a point above the rear wall 38 of the receiving chamber 35. At the upper end of flow surface 37 there is a water cooled cross piece 39. Between the flow block 36 and wall 38 there is a passage 40. As will appear from Fig. 2, the side walls 41 of chamber 35 are spaced from the side walls 42 of the furnace, leaving therebetween channels 43 which communicate at their ends with channel 40.

At the rear of the flow block there is a framework comprising uprights 45 having at their upper ends open topped bearings 46. A crane 47 is pivoted at 48 above the middle of the furnace. Around the outside of the furnace there is a track 49 upon which supporting wheels 50 of the crane are adapted to travel, one only of these wheels being shown. A motor 51 through gearing 52 drives the wheel 50 shown in Fig. 1. Preferably this wheel is arranged to support only the weight of the gear case and motor, with means for increasing the pressure as necessary in order to secure sufficient friction to move the crane, the main weight of the crane being supported on other wheels not shown. The crane is provided with a motor 53 which operates a cable shaft 54 through suitable gearing 55. Upon shaft 54 there are two drums 56, each of which operates a cable 57 running over a pulley 58 on the projecting end of the crane.

The pot 60, which is shown in connection with the apparatus, is provided with a frame having at each end an arcuate track 61, to the lower end 62 of which there is attached a chain 63, the upper end of which may be connected to one of the cables 57. A locking device 64 holds the chain against the upper end of track 61 until the lock is released. The frame is also provided at each end with a trunnion 65 adapted to rest in bearing 46.

In the operation of the device, a pot filled with glass is brought to a convenient position adjacent the furnace, which position may be at one side of the furnace opposite the middle thereof. The end of the crane is then swung over the pot, and cables 57 are attached to the upper ends of chains 63. The crane is then operated to lift the pot and swing it to either end of the furnace where it is desired to pour the glass. The pot is then lowered until trunnions 65 rest in bearings 46, whereupon locks 64 are released from the chain and at the same time operate to position retaining rods beneath bearings 46. Thereafter the crane is operated to elevate cables 57, thereby swinging the pot about trunnion 65 to the dotted line position shown at 66 in Fig. 1, whereupon it will be seen that the glass from the pot will run down flow surface 37 and into receptacle 35 in a manner which will be described more in detail later.

Above the flow opening 67 through which glass is poured into chamber 35 there is mounted a cover 68 which may have a flange 69 resting upon the sand in a groove 70 around opening 67. In the construction shown cover 68 is raised and lowered by means of a pneumatic cylinder 71, the pistons of which are connected to cables passing over appropriate guide pulls and attached to cover 68.

Figure 2:
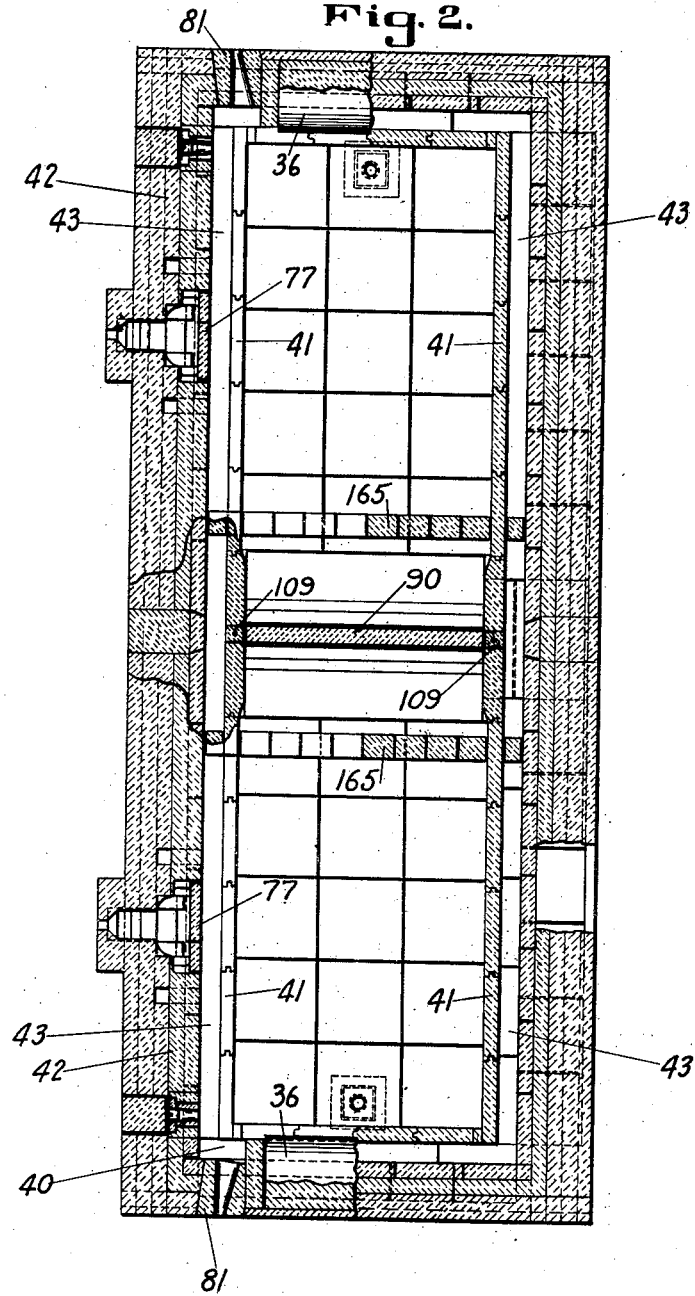
Figure 2 is a horizontal section of the furnace shown in Fig. 1 substantially along the line 2—2 of Fig. 1.
Figure 11:
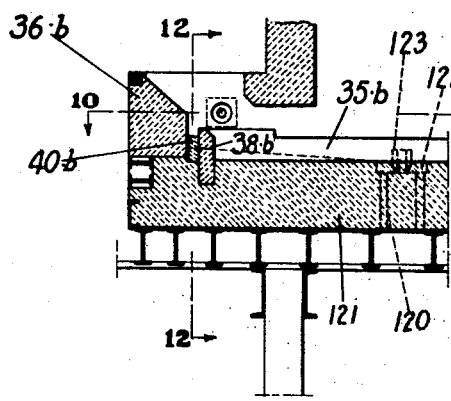
Figure 11 is a vertical section on the line 11—11 of Fig. 10.
Figure 12:
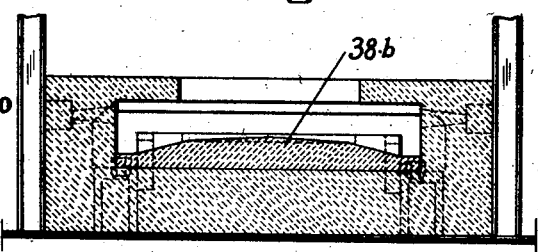
Figure 12 is a cross section substantially on the line 12—12 of Fig. 11.

In the construction shown the furnace is fired mainly from the side. As will be seen from the right side of Fig. 3, there is provided a starting burner 75 and a main burner 76 for the use of fuel oil. It will be readily understood that gas may be used in place of these oil burners when available. In the construction shown there is a deflecting block 77 which directs the flame into the upper portion of the space above chamber 35. Outlet flues 78 are shown in Figs. 1 and 2 as opening through the side of the furnace just above the top of walls 41, and then leading upward through the walls of the furnace to the top thereof. As shown in Fig. 3, there may be an opening or openings 79 in the roof 80 of the furnace, which openings may be used for additional exhaust openings, if desired, or may be used merely for inspection, and may likewise be employed for cooling the furnace, being covered with suitable blocks when not in use.

Openings such as indicated at 81 in line with channel 43 may be provided where desired for inspection purposes, and for the use of auxiliary burners where needed.

In the construction shown the floor 85 of chamber 35 slants upward from the receiving end towards the middle of the furnace, at which point there is a slightly raised ledge 86. Near the receiving end of the chamber there is an opening 87 through the floor of the chamber which may be closed by a temporary block 88 which may be broken out or removed for draining the chamber, block 88 being normally supported by a removable support in opening 87.

Supported at the middle of the furnace between ledges 86 there is a forming slab 90. In the construction shown in Fig. 1, the upper portion of this slab is clamped between a series of clevises 91, which in turn are suspended from rods 92 passing upward through a beam 93. Beam 93 is adjustably supported within a frame 94. Set screws 95 through the sides of frame 94 guide and regulate the position of beam 93 therein. The adjustment of this beam will be described more in detail in connection with the modified form shown in Fig. 15, this portion of the support being the same in both constructions.

Beneath the opening between raised portions 86 there is a chamber 96 enclosed by side walls 97 and end walls 98. Between the side walls and the downwardly projecting portion of the forming slab, there are shown resistance members 99 connected by terminals 100 with suitable sources of electric current. At the bottom of the chamber there are hinged doors 101 which may be swung to the position in which they are shown in Fig. 1, where they close the bottom of the chamber except for a central slot, or they may be swung downward to open the bottom of the chamber to any desired extent.

Mounted beneath the forming slab there are guiding and sizing rollers 102 adapted to direct a sheet of glass to an arcuate guiding block 103, which is adapted to direct a sheet of glass to a leer 104. Block 103 may be supported upon a carriage 105 adapted to run upon a track 106, so that it may be removed when desired for repairs or adjustment of the parts.

At the sides of walls 97 there are frame members 107 which are strongly braced and cannot be moved towards each other by expansion of the respective furnaces, thus forcing the expansion to take place away from the members and towards the ends of the furnace. Thus only the expansion of floor blocks 108 between members 107 and the forming slab can effect the opening between the slab and the adjacent floor blocks. At the edges of the slab there are blocks 109 which form continuations of walls 41, but are capable of adjustment in either or both of two directions. They may be moved outward to admit glass from chambers 35 to the edges of the slab or they may be moved upward to admit glass from channels 43 to the edges of the slab or they may be moved both upward and outward so as to admit glass from the two sources in adjusted proportions.

The edge of the slab may be formed in various ways as desired. In the construction shown in Figs. 1 to 3, the slab is rectangular in cross section, but it will be understood that the edge may come to a point as shown at 110 in Fig. 5, or may be rounded as shown at 111 in Fig. 6. If preferred, the edge of the slab may be provided with a groove 112, as shown in Figs. 7, 8 and 9, and in that case the end of the slab may be otherwise straight across as in Fig. 7 or have the corners rounded, as shown at 113 in Fig. 8, or rounded both at the edge of the slab and at the edge of the groove as shown at 114 in Fig. 9. Also the slab may be supported in other ways, there being indicated a supporting rod 115 in Fig. 6, and similar supporting rods may be employed in grooves 112, if desired, in which case the outer ends of the groove may be cemented, if desired, or may be left open to receive glass.

While it is preferred to flow the glass from both directions towards the forming slab, as shown in Figs. 1 and 2, a furnace may be constructed where there is but one receiving point, as shown diagrammatically in Fig. 4. In this construction there is a receiving chamber 35$^a$ into which glass is poured across flow block 36$^a$. It will be seen that the glass will flow around the channel to the opposite sides of the forming slab 90$^a$. A channel 43$^a$ may be provided around wall 41$^a$ similar to channel 43, as shown in Fig. 2.

In Figs. 10 to 14, there is shown a modified form of the receiving end of the furnace. In this construction the slab 36$^b$ rises vertically from the side of channel 40$^b$ instead of overhanging wall 38$^b$, as in the construction shown in Fig. 1. In this case there is also shown in detail an overflow arrangement for channels 43$^b$, which are similar to channels 43 shown in Fig. 2. In this construction there is an opening 120 upward through the floor 121 of the furnace, a tile 122 being set in the upper end of opening 120 and having a tube 123 rising thereabove to the desired distance.

In Figs. 15 and 16 there is shown a modified construction and arrangement of the forming slab and associated parts. In this construction the forming slab 90$^b$ is suspended by rods 124 and has its upper surface 125 beneath and adjacent to the slot 126 formed between floor blocks 108$^b$ of the furnace. Between and surrounding rods 124 there are narrow slabs 127 within slot 126 and dividing the glass in the spot where it flows on to the upper surface of the slot. Above the level of the floor of the furnace, rods 124 are incased in refractory sleeves 128. Rods 124 pass through a beam 129, which is movable vertically in a slot 130 in the roof of the furnace. The lateral position of the beam 129 is controlled by wedge members 131 suspended by rods 132 from beam $93^b$, from which rods 124 are likewise suspended. Member 129, therefore, acts as a guide for the rods, adjustment of wedges 131 determining the exact position of the rods in slot 130, and being movable upward and downward so as to retain the exact lateral position of the rods regardless of vertical adjustment of beam $93^b$.

Cover blocks 133 are placed above slot 130 and are perforated for the passage of rods 124 and 132. As will appear from Fig. 15, the end of beam $93^b$ is suspended by a bolt 135, which is screwed into the hub 136 of a bevel gear 137, which in turn is mounted in a plate 138. Plate 138 is in turn mounted slidably upon a plate 139 and is adjustable in position upon plate 139 by screws 140, adjustment being provided for this plate in both the direction shown in Fig. 15 and in a direction at right angles thereto.

Plate 138 carries a bracket 141 in which there is mounted a shaft 142 having thereon a beveled gear 143 meshing with gear 137. On the end of shaft 142 there is a sprocket wheel 144, which may be operated by a chain 145 running down the sides of the furnace to a convenient position where it may be manipulated to adjust the elevation of slab $90^b$. It will be readily understood that the mounting of each end of beam $93^b$ is the same, and that shaft 142 runs across the top of the furnace and operates gears 143 at each side of the furnace so as to raise and lower both ends of beam $93^b$ simultaneously.

In the construction shown in Fig. 1, the shaft 142 and the operating means for vertical adjustment of the slab are not so essential, because the slab projects through the slot in the bottom of the furnace and the exact vertical position thereof is not so important. In the construction shown in Fig. 15, the extent of the flow of glass is dependent upon the distance of upper surface 125 below slot 126, so that the flow of glass may be accurately determined by the vertical position of the slab and exact vertical adjustment of the slab for this purpose from time to time is desirable.

In the construction shown in Fig. 15, there are disclosed brackets 146 mounted upon side walls $97^b$ and slidable within these brackets are burner members 147 comprising pipes 148 and nozzles 149 from which fuel gas may be projected. In Fig. 15 these burners are shown spread apart and calibrated so that the sheet-receiving mechanism may be removed, if desired. When the burners are in use, they may be slid downward approximately to the position shown in dotted lines in Fig. 15 or, when the receiving apparatus is removed, the burners may be moved towards each other still further so as to close the bottom of chamber $96^b$ to the desired amount. Walls $97^b$ are provided with channels 150 for carrying off the products of combustion. Passage 150 communicates with chamber $96^b$ through a series of openings 151.

Beneath the furnace there is a carriage 155 supported by wheels 156 running on tracks 157. This carriage receives guiding and sizing rollers 158, which receive glass from the slab and guide it downward to a bending construction formed of a series of rollers 159 with intermediate blocks 160, which may be surfaced with graphite or other suitable material, and may be water-cooled, if desired. Carriage 155 is adapted to be moved in a position to receive the glass from slab $90^b$ and direct it to supporting rollers 161 in a leer 162. Preferably, rollers 158 and 159 are driven at the same surface speed as the rollers 161 in the leer.

The operation of the different portions of the apparatus has been indicated as the description proceeded and the detailed operation of various portions of the apparatus need not be repeated, but the general operation of the device and the particular adantages claimed for this invention will be briefly set forth.

It will be understood that this construction is primarily intended for substantially continuous operation and that glass will be maintained continuously in chambers 35 throughout the operation of the device, although work may be stopped and chambers 35 drained, when desired. The glass flows from chambers 35 upon and along the forming slab and is there subjected to proper heat conditions and flows from the bottom of the slab through the guiding or sizing rollers and down the bending members to the leer, this construction being substantially as disclosed in prior patents, differing therefrom only in details. The glass in chamber 35 is replenished from time to time by pouring glass from pots down flow block 36 or $36^b$. When a pot is raised to the position shown in dotted lines in Fig. 1, the contents thereof flow down the pouring block and into chamber 35.

A certain amount of the glass clings to flow surface 37 and follows around the surface of block 36 down into channel 40. When the main portion of the glass from the pot has flowed down the block into chamber 35, there is a continued solid flow of glass which has clung to the walls of the pot and is drained out somewhat slowly. This glass in contact with the walls of the pot is apt to contain more impurities than the main body of the glass within the pot and, in the construction shown, this glass, since it flows from the pot in a comparatively slow stream, is drained to a considerable extent into passage 40 and from there into channels 43. After the pot has been emptied, there still clings a certain amount of glass to the surface of the flow block, the cover 68 is then lowered and during the subsequent operation of the furnace the glass clinging to the flow block is melted off, all except a slight glaze over the surface thereof. As this glaze melts from the flow block, it runs down into channel 40 and from there into channels 43.

In this way, a large part of the more impure glass from the pot as well as the glass which initially clings to the flow block and is slowly melted therefrom, is separated from the main body of the glass which enters chamber 35 and is directed into channels 40 and 43. This glass in channel 43 assists in maintaining an even temperature adjacent the walls 41 of chamber 35. If desired, blocks 109 may be operated so as to admit this relatively impure glass to the edges of the forming slab, since the glass admitted to the edges of the forming slab forms the edges of the finished sheet which generally constitute waste glass.

If preferred, the glass in channels 43 may be partially or entirely drained off through overflow openings such as described in connection with Figs. 10 to 14. When using such an overflow opening, the glass may initially freeze around the opening, but when the furnace is in regular operation, slab 122 and tubes 123 are set so far above the bottom of opening 120 that they remain heated and the passage through tube 123 is maintained open, so that the glass flows downward through tube 123 as long as its level is above the top of the tube.

Figure 13:
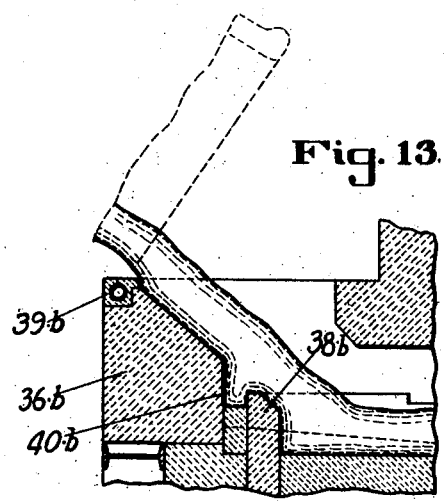
Figure 13 is an enlarged detail on the same line as Fig. 11 illustrating the operation of the glass during pouring of glass into the furnace.

The construction shown in Figs. 10 to 13 operates substantially the same as that shown in Fig. 1, the impure glass being drained off through the passages 40$^b$ and 43$^b$. However, for some purposes the construction shown in Fig. 13 is preferred, because channel 40$^b$ is more completely open to heat from the furnace so that it is maintained at all times at sufficiently high temperature, and, furthermore, the capacity of the channel is reduced so that there will not be an excessive amount of the comparatively good glass pass into the channel during the main pouring operation.

Any drip from the pot coming in contact with water-cooled member 39 is congealed thereon and can be readily freed therefrom and either shoved into the furnace and allowed to pass down into channel 40 or 40$^b$, or it may be removed in any other desired way. This will avoid any sticking of the cover or sealing of it in place by molten glass when it is lowered after a pouring operation.

It will be understood that the flow of the glass to the slab may be controlled in the form shown in Fig. 1 by the vertical adjustment of gates 165. If the level of the glass in one chamber 35 is temporarily higher than that in the other chamber 35, the gate 165 from the chamber in which the glass is higher may be lowered so as to counterbalance the height of the glass and render the flow from the two chambers substantially equal, or if it is desired for any reason to have the film of glass on one side of the remaining slab thicker than on the other side, this may be accomplished by proper relative adjustment of the slabs.

In the form shown in Fig. 15, gates 165$^b$ may be manipulated as desired, but are not as important in regulating the flow of the glass because in this form the glass flows over dividing slabs 127, and so the flow over the opposite sides of the slab are determined by the adjustment of the slab rather than by the direction in which the glass flows to the slot above the slab. It follows that one gate 165$^b$ might be entirely closed down and the feed might be entirely from one side without materially changing the operation of the forming slab, since the glass in the chamber between gates 165$^b$ tends to come to a substantially equal level on both sides of the slot.

The construction shown in Fig. 15 whereby the guiding or sizing rollers 158 are supported by carriage 155 and may be entirely removed is advantageous because of allowing ready access to the different parts. In the construction shown these rollers are brought into relatively close proximity to the bottom of the slab which has been found advantageous, especially where the rollers are to be used for sizing the sheet, since they allow a relatively slow flow of the glass and at the same time avoid danger of lapping of glass, which is apt to occur when too great a distance separates the end of the slab from the sides of the rollers.

Figure 10:
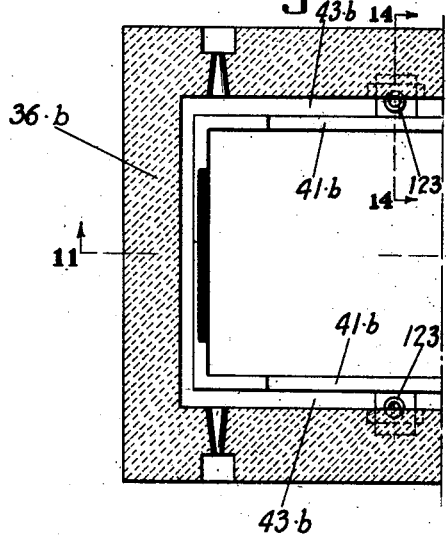
Figure 10 is a partial view, somewhat similar to Fig. 2, of the receiving end of a modified form of the construction.
Figure 14:
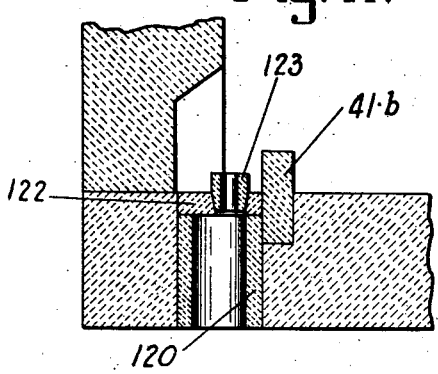
Figure 14 is a detail section on the line 14—14 of Fig. 10.

The waste glass which flows under the sides of the furnace aids in providing a uniform temperature along the walls 41 or 41$^b$, and the construction shown in Figs. 10 and 14, whereby the glass is maintained at a substantially constant level in the passage 43$^b$, is helpful in maintaining the conditions constant.

While some modifications have been indicated in the foregoing description, it will be readily understood that other changes may be made within the scope of the appended claims. For one thing, the foregoing description has dealt solely with melting in pots; but it will be understood that the segregation of poor glass would be effected the same way if the glass was melted in a tank and then transferred to the working chamber by pots. If glass is ladled into the working furnace by ladles to which the glass does not adhere, still a deflecting arrangement similar to that shown may be used to carry off defective glass injured by contact with the flow block or its water-cooled receiving member, or glass chilled by contact with the ladle so that it flows down the block sluggishly, or only as it is remelted. In other words the invention takes care of defective glass flowing down the flow block, however the glass has been prepared and poured onto the flow block.

What is claimed is:

1. The method of treating glass, which comprises melting glass in a pot, emptying the pot for glass formation by tilting the pot and pouring the glass therefrom rapidly, and diverting from the main body of the poured glass the major part of the glass which is in contact with the pot walls before the pouring.

2. The method of treating glass, which comprises melting glass in a pot, emptying the pot for glass formation by tilting the pot and pouring the glass therefrom rapidly, and diverting from the under side of the poured glass a substantially constant stream during the pouring operation.

3. The method of treating glass, which comprises melting the glass in pots, pouring the glass from the pots in succession into a working furnace, and segregating from the glass poured into the working furnace a portion of the glass containing the major part of the glass which was in contact with the walls of the pot previous to the pouring.

4. The method of treating glass, which comprises melting glass in pots and pouring the glass from the pots in succession into a working furnace and diverting from the main pool of the working furnace a substantially continuous stream of glass during the pouring, whereby the major portion of the glass in contact with the walls of the pot before pouring is diverted.

5. The method of making a continuous sheet of glass which comprises melting the glass in pots, pouring the molten glass from the pots in succession into a working furnace so as to produce a continuous supply of glass in said furnace, diverting the major part of the glass in contact with the pots, before pouring, from the mass which enters the main pool of the working furnace during pouring, and forming a continuous sheet from the glass in the furnace.

6. Glass making apparatus comprising a working furnace, a flow block at the entrance end of said working furnace, and a channel across the lower portion of said flow block for diverting part of the glass flowing over said block.

7. Glass making apparatus comprising a working furnace having a main pool, furnace walls spaced from said main pool and leaving a channel therebetween, a flow block at the entrance end of the pool, and a transverse channel across the bottom end of said flow block and leading into said side channels.

8. Glass making apparatus comprising a working furnace having a main pool and side walls spaced from said main pool, leaving a channel along the sides of said pool, an overflow member having a passage therethrough permitting the escape of glass from said channel when it rises above a predetermined level, and means for supplying glass to said channels.

9. In glass making apparatus, a working furnace having walls along its sides spaced from the main furnace walls, leaving channels inside of said main furnace walls, and having a flow block at the entrance end, there being a transverse channel across the lower end of said flow block and connecting with the first said channels.

10. Glass making apparatus comprising a working furnace having a flow block at the entrance end thereof and a passage from the lower portion of said flow block for diverting a portion of the glass flowing down said block.

11. Glass making apparatus comprising a working furnace having a flow block at its entrance end, there being a passageway across the lower portion of said flow block for diverting glass, and a water cooled member at the upper end of said flow block.

12. Glass making apparatus comprising a working furnace having a flow block at its entrance end, adapted to receive glass from a melting pot, and a water cooled member at the upper edge of said flow block adapted to receive a pouring lip.

13. The method of securing uniform glass in chamber, which consists in flowing glass over a flow block into the chamber and diverting from the stream on the flow block the lower portion thereof, whereby the slowly moving sluggish portion of the glass is diverted.

In testimony whereof I have hereunto signed my name to this specification.

EDWARD DANNER.